(12) United States Patent
Komine et al.

(10) Patent No.: US 7,281,027 B2
(45) Date of Patent: Oct. 9, 2007

(54) DISTRIBUTED PROCESSING SYSTEM AND NETWORK MONITORING SYSTEM

(75) Inventors: Hiroaki Komine, Kawasaki (JP);
Noriyuki Yokoshi, Kawasaki (JP);
Sachinobu Sakurada, Kawasaki (JP);
Tsuyoshi Naka, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 369 days.

(21) Appl. No.: 10/151,970

(22) Filed: May 22, 2002

(65) Prior Publication Data

US 2002/0145625 A1 Oct. 10, 2002

Related U.S. Application Data

(63) Continuation of application No. PCT/JP99/07252, filed on Dec. 22, 1999.

(51) Int. Cl.
*G06F 3/00* (2006.01)
(52) U.S. Cl. ............ 709/203; 709/219; 715/736; 715/733; 715/745; 707/10
(58) Field of Classification Search ............ 715/736, 715/733, 734, 745; 707/103 X, 710
See application file for complete search history.

(56) References Cited

U.S. PATENT DOCUMENTS

| | | | | |
|---|---|---|---|---|
| 5,721,817 | A * | 2/1998 | Kurihara et al. | 709/227 |
| 6,035,404 | A * | 3/2000 | Zhao | 726/6 |
| 6,144,959 | A * | 11/2000 | Anderson et al. | 707/9 |
| 6,185,567 | B1 * | 2/2001 | Ratnaraj et al. | 707/10 |
| 6,266,752 | B1 * | 7/2001 | Witt et al. | 711/200 |
| 6,297,819 | B1 * | 10/2001 | Furst | 715/733 |
| 6,308,209 | B1 * | 10/2001 | Lecheler | 709/224 |
| 6,362,836 | B1 * | 3/2002 | Shaw et al. | 715/744 |
| 6,381,631 | B1 * | 4/2002 | van Hoff | 709/202 |
| 6,714,217 | B2 * | 3/2004 | Huang et al. | 715/736 |

FOREIGN PATENT DOCUMENTS

JP WO01/46820 A1 12/1999

OTHER PUBLICATIONS

Japanese Abstract No. 11-031129, dated Feb. 2, 1999.
Japanese Abstract No. 04311252, dated Nov. 4, 1992.
Japanese Abstract No. 07079243, dated Mar. 20, 1995.
Japanese Abstract No. 62276652, dated Dec. 1, 1987.
Japanese Abstract No. 09-288601, dated Nov. 4, 1997.
Hiroshi Tomita, et al., Hitachi Hyoron, Hitachi Hyoronsha, May 1, 1998, vol. 80, No. 5, (pp. 31-34) (Japanese and English).
PCT/JP99/07252—PCT International Preliminary Examination Report, Dec. 22, 1999.

* cited by examiner

*Primary Examiner*—Kristine Kincaid
*Assistant Examiner*—Ryan Pitaro
(74) *Attorney, Agent, or Firm*—Staas & Halsey LLP (57) ABSTRACT

A distributed processing system wherein client-side process is simplified and system reliability is improved. An information transmission requesting section makes a request for transmission of information, and an information providing section provides received information to a user. An information management section manages the information, and an information relaying/transmitting section relays the information to be transmitted to a client application. An account authentication section verifies authenticity of account of the client application, and an information storage section stores the information. After the authenticity is verified, a service application control section controls the start and termination at logon and logoff, respectively, of a service application corresponding to the client application.

2 Claims, 9 Drawing Sheets

DISTRIBUTED PROCESSING SYSTEM AND NETWORK MONITORING SYSTEM

This application is a continuing application, filed under 35 U.S.C. §111(a), of International Application PCT/JP99/07252, filed Dec. 22, 1999.

BACKGROUND OF THE INVENTION (1) Field of the Invention

The present invention relates to a distributed processing system and a network monitoring system, and more particularly, to a distributed processing system for performing distributed processing to provide services and to a network monitoring system for performing distributed processing to monitor a network.

(2) Description of the Related Art

In recent years, distributed processing technique typified by a client/server model is widely used as one form of processing by a computer system. Distributed processing denotes processing wherein a plurality of computers or applications are interconnected in a networked environment, share resources and cooperatively operate to provide services.

Figure 8:
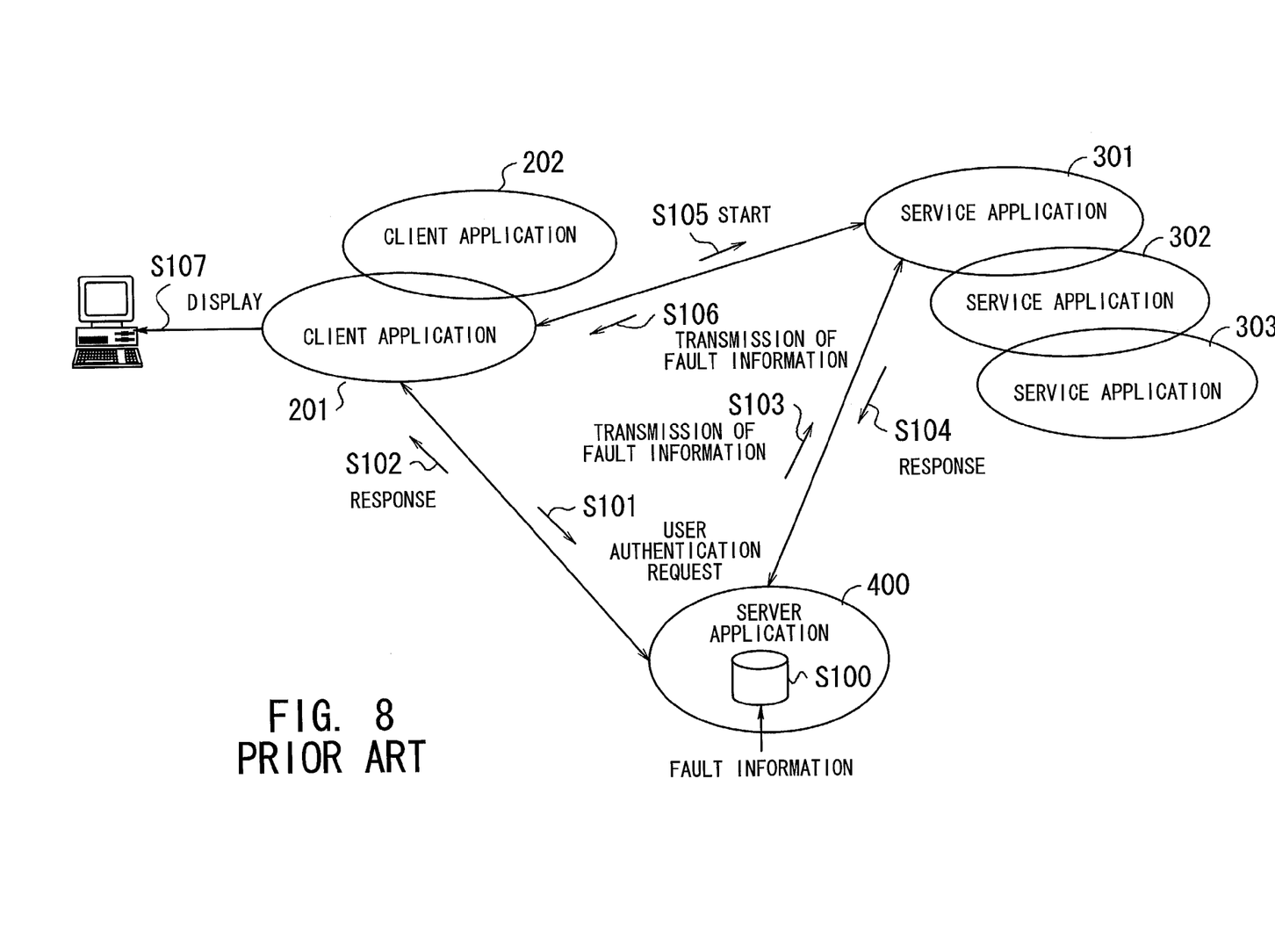
FIG. 8 is a diagram showing an example of a distributed processing system.

FIG. 8 shows an example of a distributed processing system. The system shown in FIG. 8 comprises client applications 201 and 202, service applications 301 to 303, and a server application 400.

The client applications 201 and 202 are each an application which requests service information. The server application 400 is an application which collectively stores and manages the service information.

The service applications 301 to 303 are each an application which receives the service information from the server application 400 and provides the requested service information to the client applications 201 and 202.

Let it be assumed that the system shown in FIG. 8 is a system for monitoring a network. It is also assumed that the client application 201 is a GUI (Graphical User Interface) for displaying on screen information about a fault occurring on the network, and that the service application 301 is an application for providing such fault information.

The operation will be now described.

[S100] The server application 400 receives and stores fault information transmitted from the network.

[S101] The client application 201 transmits a user authentication request to the server application 400.

[S102] On recognizing authenticity of the user, the server application 400 returns a normal response to the client application 201.

[S103] The server application 400 transmits the fault information to the service application 301.

[S104] The service application 301 returns a normal response to the server application 400.

[S105] The client application 201 starts the service application 301 from which the fault information is to be notified.

[S106] The service application 301 transmits the fault information to the client application 201.

[S107] The client application 201 receives the fault information transmitted from the service application 301 and displays the information on screen.

Among the above steps, Steps S101 and S105 are executed as part of a logon operation by the client application 201. At the time of logoff, the client application 201 terminates the service application 301 and ends the use status.

In the conventional distributed processing system described above, however, when the client application 201 logs on or off, it is necessary that interrelation with the corresponding service application 301 be established before the client application 201 starts or terminates.

Specifically, the client application 201, which displays (or stops displaying) the fault information, is required to select the corresponding service application 301 before started (or terminated). Thus, the logon/logoff process performed on the part of the user involves many steps, giving rise to a problem of low efficiency.

Also, in the conventional system, in cases where the client application 201 undergoes an abnormal end and is restarted, a problem arises in that status inconsistency occurs between the client application 201 and the server application 400.

Figure 9A:
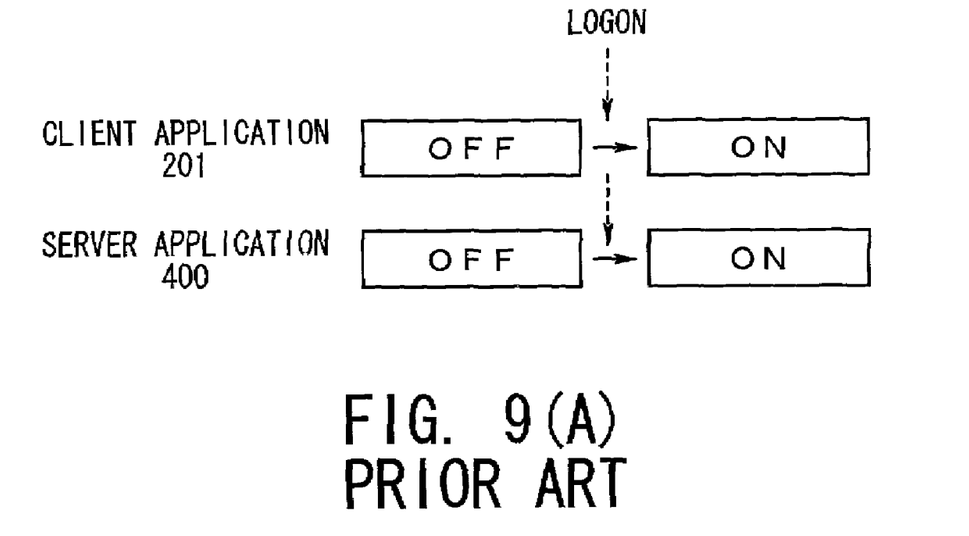
Figure 9B:
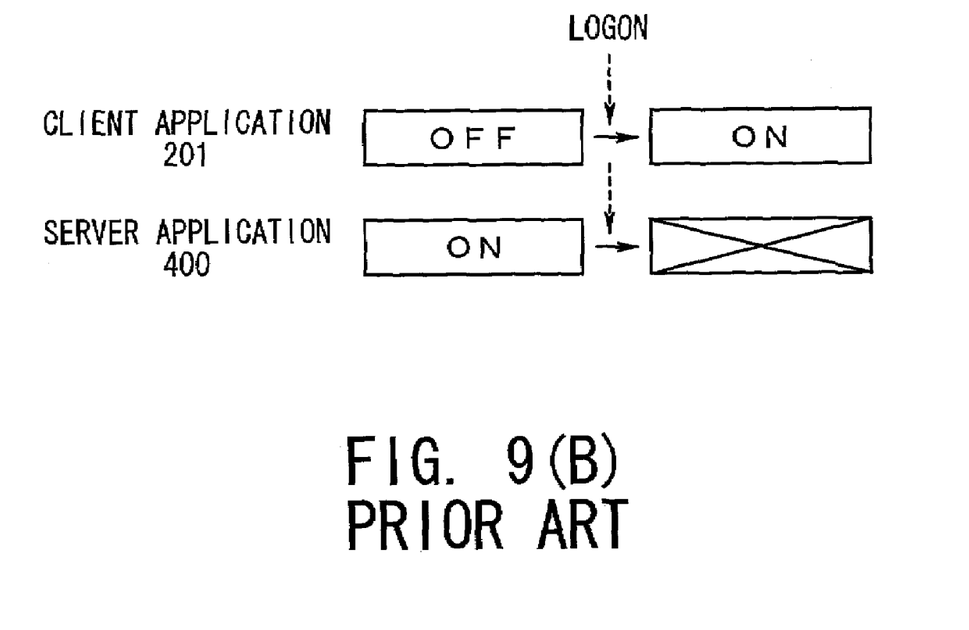

FIGS. 9(A) and 9(B) illustrate such status inconsistency between the client application 201 and the server application 400, wherein FIG. 9(A) shows normal operation and FIG. 9(B) shows a case where the client application 201 is restarted after abnormal end. In FIGS. 9(A) and 9(B), "ON" indicates logged-on state and "OFF" indicates logged-off state.

As shown in FIG. 9(A), in the case where the client application 201 has normally ended and thus is OFF, the server application 400 also is OFF. When the client application 201 is set ON, the server application 400 is instructed to log on and thus is set ON.

In the case where, as shown in FIG. 9(B), the client application 201 undergoes an abnormal end and turns OFF, the server application 400 remains ON. When the client application 201 is thereafter restarted and set ON, the server application 400 is instructed to log on; however, since the server application 400 is already ON, there is the possibility that an error arises.

Thus, in cases where the client application 201 is restarted after abnormal end, a disadvantage arises in that the server application 400, which remains in the logged-on state, is additionally instructed to log on, and this lowers the reliability of the system.

SUMMARY OF THE INVENTION

The present invention was created in view of the above circumstances, and an object thereof is to provide a distributed processing system wherein client application-side process is simplified and also reliability of the system is improved.

Another object of the present invention is to provide a network monitoring system wherein client application-side process is simplified and also reliability of the system is improved.

To achieve the first object, there is provided a distributed processing system for performing distributed processing to provide information to a user. The distributed processing system comprises a client device having a client application, the client application including information transmission requesting means for making a request for transmission of the information and information providing means for providing the received information to the user, an information relaying device having a service application, the service application including information management means for managing the information and information relaying/transmitting means for relaying the information to be transmitted to the client application, and a server device having a server application, the server application including account authentication means for verifying authenticity of account of the client application, information storage means for storing the information, and service application control means for controlling start and termination at logon and logoff, respectively, of the service application corresponding to the client application after the authenticity is verified by the account authentication.

Also, to achieve the second object, there is provided a network monitoring system for performing distributed processing to monitor a network. The network monitoring system comprises a client device having a client application, the client application including information transmission requesting means for making a request for transmission of network information and information providing means for providing the received network information to a user, and a server device having a service application and a server application, the service application including information management means for managing the network information and information relaying/transmitting means for relaying the network information to be transmitted to the client application, the server application including account authentication means for verifying authenticity of account of the client application, information storage means for storing the network information, and service application control means for controlling start and termination at logon and logoff, respectively, of the service application corresponding to the client application after the authenticity is verified by the account authentication.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 9(A) and 9(B) are diagrams illustrating status inconsistency between a client application and a server application, wherein FIG. 9(A) shows normal operation, and FIG. 9(B) shows a case where the client application undergoes an abnormal end and is restarted.

DESCRIPTION OF THE PREFERRED EMBODIMENTS

Figure 1:
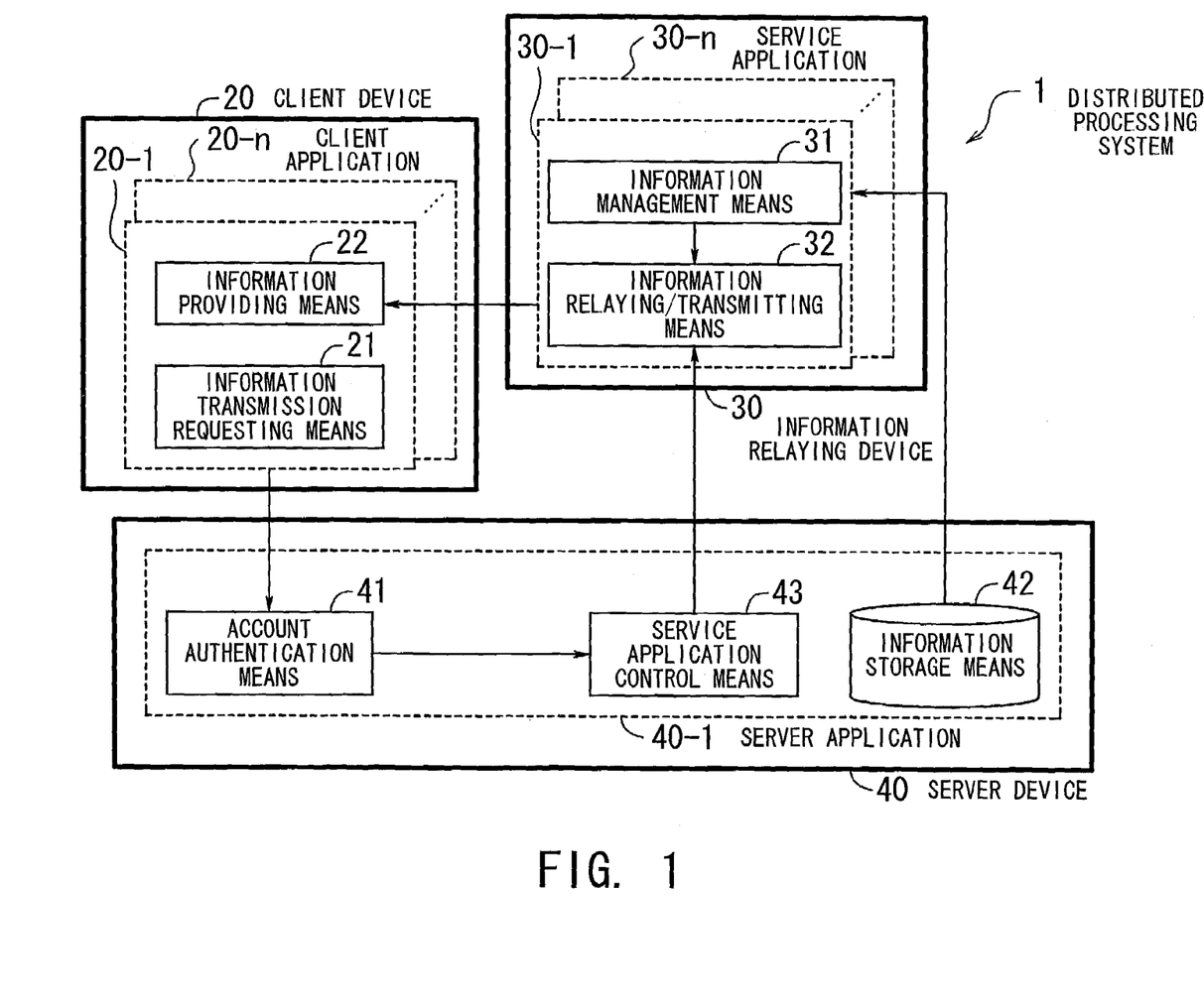
FIG. 1 is a diagram illustrating the principle of a distributed processing system according to the present invention.

Embodiments of the present invention will be hereinafter described with reference to the drawings. FIG. 1 illustrates the principle of a distributed processing system according to the present invention. The distributed processing system 1 comprises a client device 20, an information relaying device 30 and a server device 40, and performs distributed processing to provide information to users.

Although in FIG. 1, the information relaying device 30 and the server device 40 are illustrated as independent devices, service applications 30-1 to 30-n in the information relaying device 30 may be incorporated in the server device 40 so that the server device 40 may also function as the information relaying device 30.

The client device 20 has a plurality of client applications 20-1 to 20-n. The client applications 20-1 to 20-n are each an application which requests information and provides received information to the user via a user interface.

The information relaying device 30 has a plurality of service applications 30-1 to 30-n. The service applications 30-1 to 30-n are each an application which relays information to a corresponding one of the client applications 20-1 to 20-n.

The server device 40 has a server application 40-1. The server application 40-1 is an application for collectively storing and managing information.

Each of the client applications 20-1 to 20-n comprises information transmission requesting means 21 and information providing means 22.

The information transmission requesting means 21 transmits a user authentication request etc. to request the server application 40-1 to transmit information. The information providing means 22 provides the information received from the service applications 30-1 to 30-n to the user via a GUI, for example.

Each of the service applications 30-1 to 30-n comprises information management means 31 and information relaying/transmitting means 32.

The information management means 31 manages the information transmitted from the server application 40-1. The information relaying/transmitting means 32 relays the information to be transmitted to a corresponding one of the client applications 20-1 to 20-n.

The server application 40-1 comprises account authentication means 41 information storage means 42 and service application control means 43.

The account authentication means 41 verifies authenticity of accounts of the respective client applications 20-1 to 20-n. The account authentication means 41 has a user account management table T, described later. The information storage means 42 stores information.

After authenticity of the client applications 20-1 to 20-n is verified by the account authentication, the service application control means 43 controls the start and termination at logon and logoff, respectively, of the individual service applications 30-1 to 30-n corresponding to the client applications 20-1 to 20-n.

The server application 40-1 further includes timer setting means and communication state monitoring means. The timer setting means starts a timer at the time of logon of the server application 40-1 and, when a timer set value is reached, autonomously causes the server application 40-1 to log off.

The communication state monitoring means monitors the state of communication between the server application 40-1 and the individual client applications 20-1 to 20-n and, in case of fault, autonomously causes the server application 40-1 to log off. The timer setting means and the communication state monitoring means will be described in detail later.

As described above, the distributed processing system 1 according to the present invention is constructed such that the start and termination at logon and logoff, respectively, of the individual service applications 30-1 to 30-n corresponding to the client applications 20-1 to 20-n are controlled by the server application 40-1.

This serves to simplify the logon/logoff process of the individual client applications 20-1 to 20-n, making the user-side operation more transparent.

Figure 2:
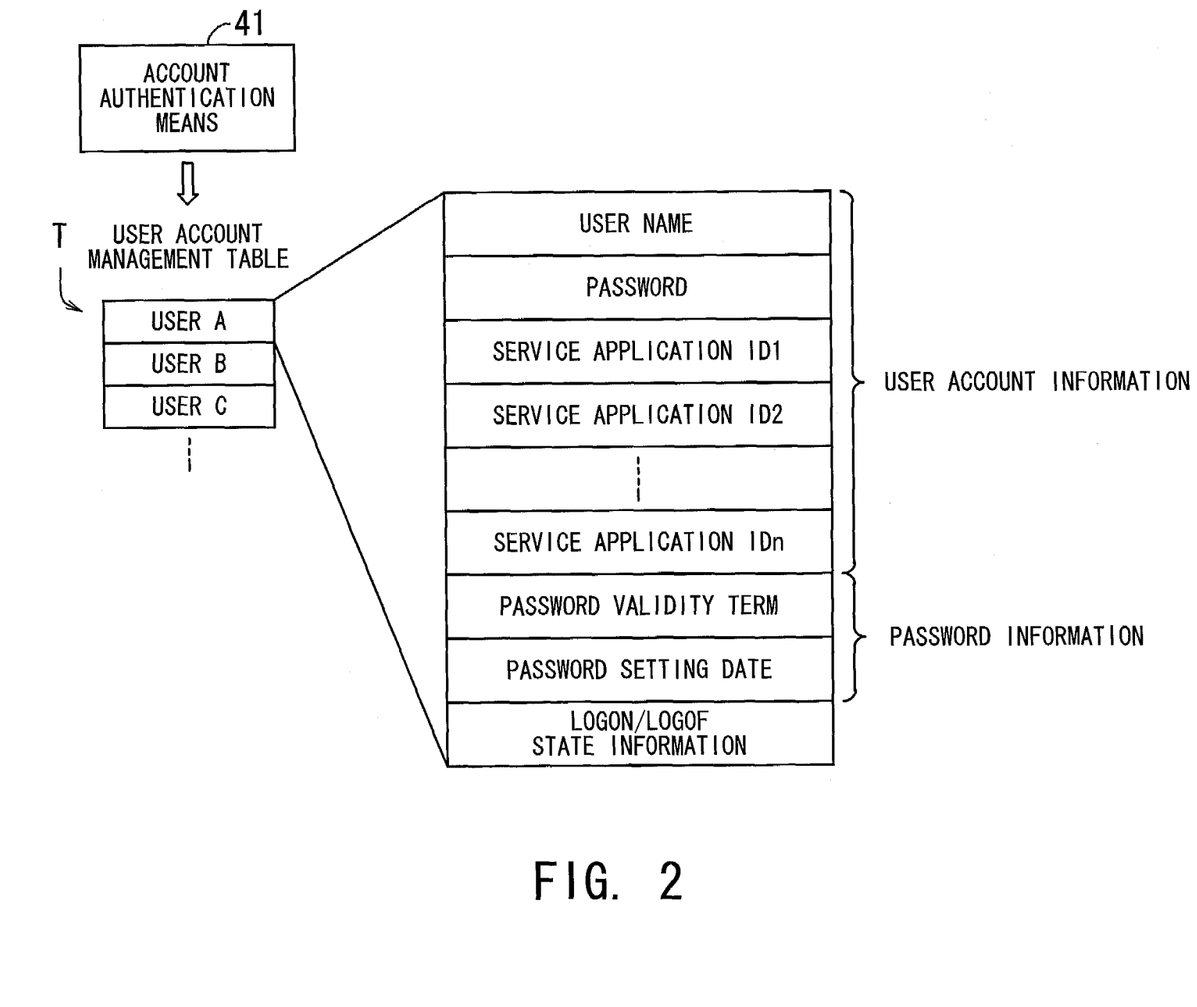
FIG. 2 is a diagram showing an exemplary arrangement of a user account management table.

The user account management table T will be now described. FIG. 2 shows an exemplary arrangement of the user account management table T. The user account management table T manages, as user account information, user names, passwords, and service application IDs of the service applications 30-1 to 30-n which the client applications 20-1 to 20-n are to make use of. A plurality of service application IDs can be set per user, as shown in FIG. 2.

The user account management table T also manages, as password information, password validity terms and password setting dates. For example, if the password validity term is 60 days and the password setting date is October 20, then it means that the password concerned can be used for 60 days from October 20.

Also managed by the table T is logon/logoff state information which indicates whether the server application 40-1 is currently in a logged-on or logged-off state.

Using the user account management table T, the account authentication means 41 verifies authenticity of accounts and also detects inconsistency as to the logon/logoff state.

If it is judged based on the user account management table T that the user account information transmitted from the client application 20-1 is not authentic, the account authentication means 41 sends a notification of error to the client application 20-1.

Detection of inconsistency as to the logon/logoff state will be now described. If, after logons of the client and server applications 20-1 and 40-1, the client application 20-1 abnormally ends for some reason or other, the user will restart the client application 20-1 and retry a logon.

In such cases, in the conventional system, although the server application 40-1 is already in the logged-on state, logon software runs as soon as a logon is instructed from the client application 20-1, possibly bringing the server application 40-1 to an abnormal state.

On the other hand, in the present invention, information indicating the current logged-on/logged-off state of the server application 40-1 is described in the user account management table T. When a logon is instructed from the client application 20-1, the account authentication means 41 checks the current state of the server application 40-1. If there is status inconsistency between the client application 20-1 and the server application 40-1, a notification of error is sent to the client application.

Let it be assumed, for example, that after both the client and server applications 20-1 and 40-1 logged on, the client application 20-1 abnormally ended; therefore, the user restarts the client application 20-1 and retries a logon.

In such cases, according to the present invention, the account authentication means 41 recognizes from the logon/logoff state information in the user account management table T that the server application 401 is already in the logged-on state and, therefore, notifies the client application 20-1 of error.

This prevents the server application 40-1, which remains in the logged-on state, from being brought to an abnormal state even if additionally instructed to log on, whereby the reliability of the system can be improved.

Figure 3:
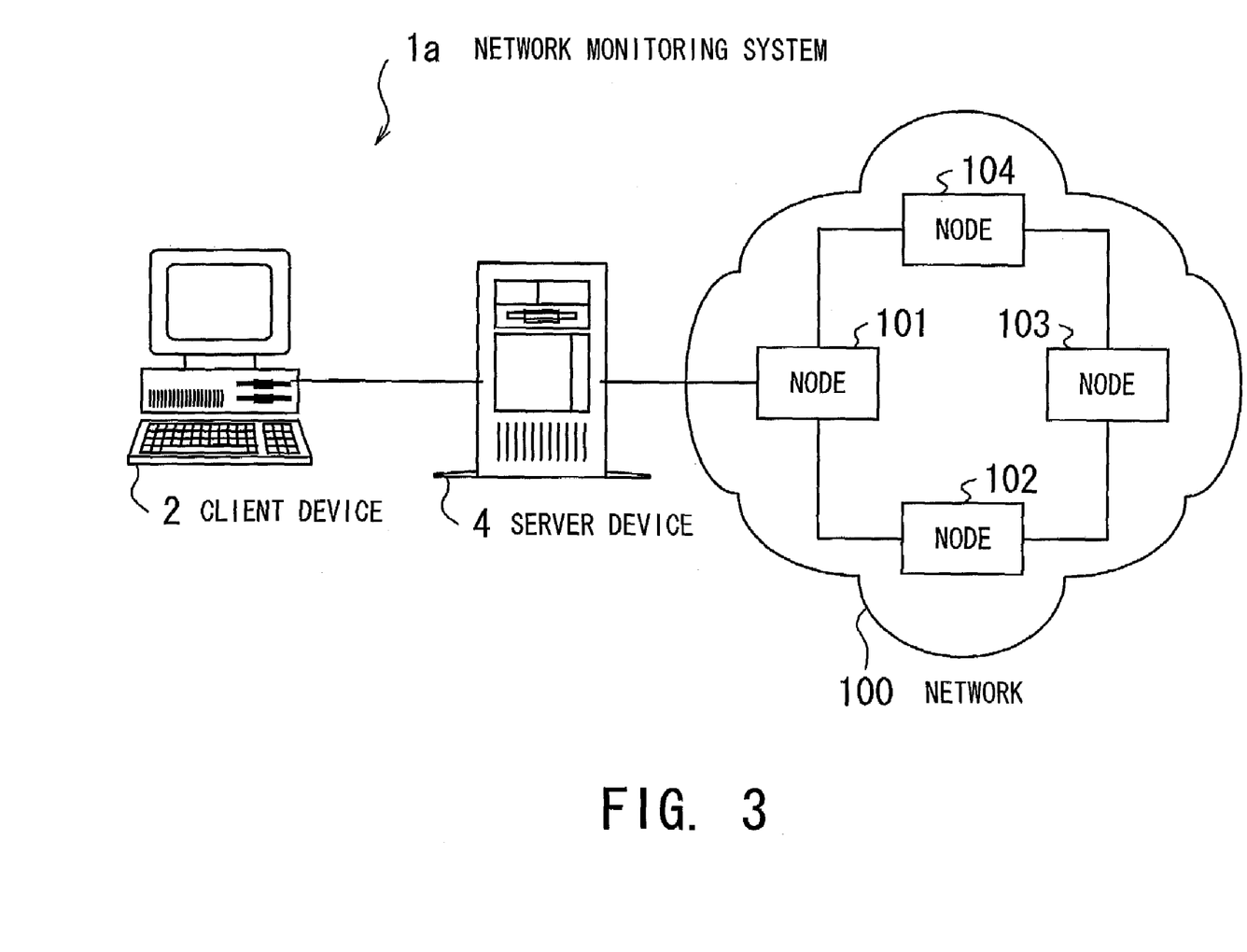
FIG. 3 is a diagram showing a configuration of a network monitoring system.

The distributed processing system 1 according to the present invention will be now described in more detail, taking a network monitoring system as an example of application. FIG. 3 shows a configuration of such a network monitoring system.

The network monitoring system 1a comprises a network 100, a client device 2 and a server device 4. The network 100 includes nodes 101 to 104 with a transmission capacity of 10 Gb/s, for example, and the nodes are interconnected by an optical fiber into ring form, thus constituting a ring network.

The server device 4 is connected to the node 101, and the client device 2 is connected to the server device 4. The server device 4 collects network information from the network 100, and the client device 2 provides the collected network information to the user.

The network information corresponds to fault information about fault occurring within the network 100, and performance information including operation status of the system, use status of system resources, etc.

The server device 4 corresponds to the server device 40 and the information relaying device 30 described above with reference to FIG. 1, and has the server application 40-1 as well as the service applications 30-1 to 30-n. The client device 2 corresponds to the client device 20 described above with reference to FIG. 1.

Figure 4:
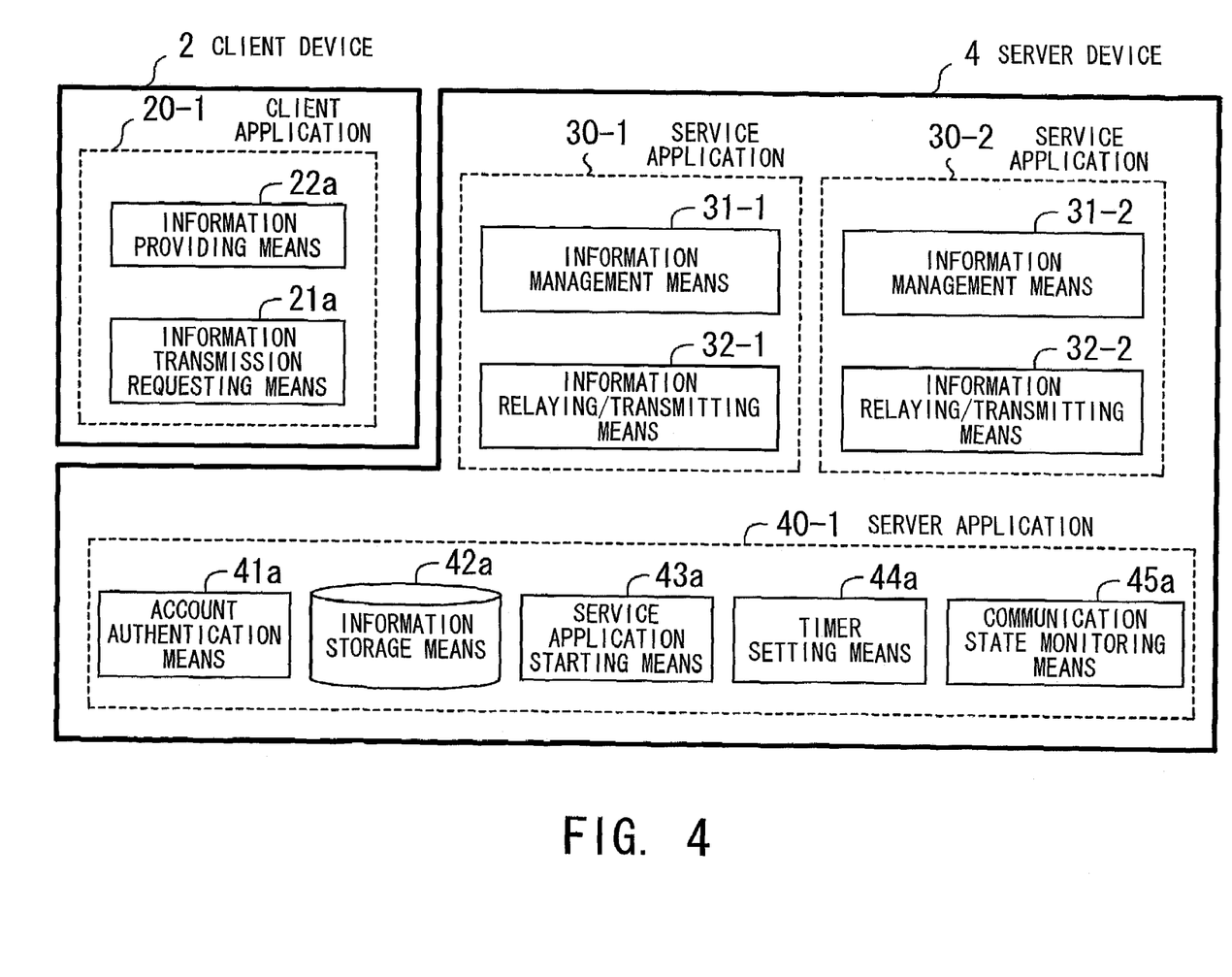
FIG. 4 is a diagram showing internal configurations of client and server devices.

FIG. 4 shows internal configurations of the client and server devices 2 and 4. For simplicity's sake, it is assumed that the client device 2 has a single client application while the server device 4 has two service applications.

The client device 2 has a GUI-based client application 20-1.

The server device 4 has a server application 401 for collecting the fault information about fault occurring within the network 100 as well as the performance information, a service application 30-1 for providing the fault information to the client application 20-1, and a service application 30-2 for providing the performance information to the client application 20-1.

Information transmission requesting means 21a requests the server application 40-1 to transmit the network information. Information providing means 22a provides the user with the network information received from the service applications 30-1 and 30-2.

Information management means 31-1 manages the fault information transmitted from the server application 40-1. Information relaying/transmitting means 32-1 relays the fault information to be transmitted to the client application 20-1.

Information management means 31-2 manages the performance information transmitted from the server application 40-1. Information relaying/transmitting means 32-2 relays the performance information to be transmitted to the client application 20-1.

Account authentication means 41a verifies authenticity of the account of the client application 20-1 and also detects the aforementioned inconsistency as to the logon/logoff state. Information storage means 42a stores the network information such as the fault information and the performance information.

After authenticity of the client application 201 is verified by the account authentication, service application starting means 43a controls the start and termination at logon and logoff, respectively, of the individual service applications 30-1 and 30-2 corresponding to the client application 20-1. Timer setting means 44a and communication state monitoring means 45a will be described later with reference to FIGS. 6 and 7, respectively.

Figure 5:
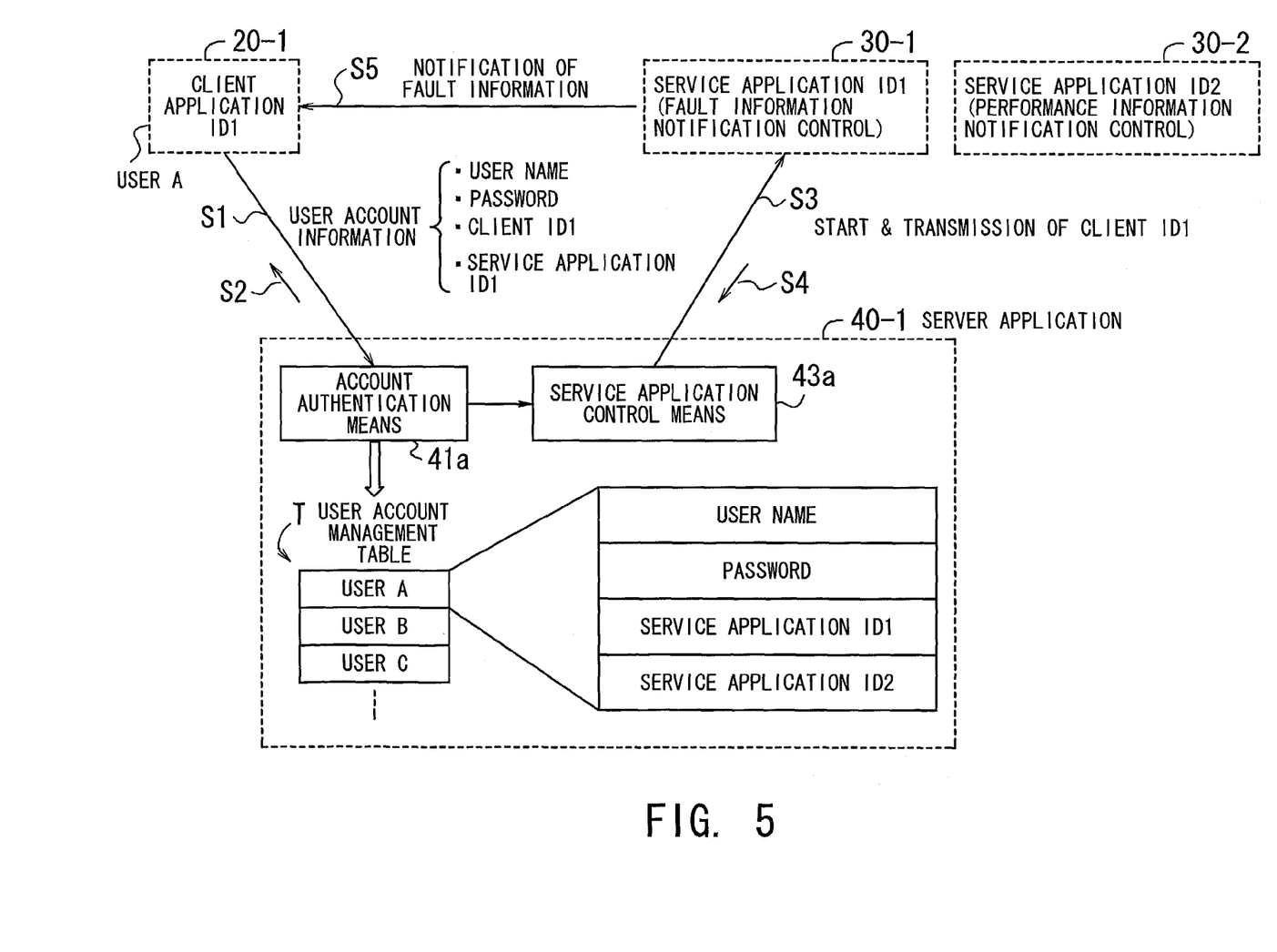
FIG. 5 is a diagram illustrating start of a service application.

Operation in relation to the start of a service application at the time of logon will be now described. FIG. 5 illustrates the start of a service application, more specifically, the start of the service application 30-1 which is necessary for the client application 20-1 to display the fault information.

The user account management table T of the account authentication means 41*a* manages, as the user account information for the user A, the user name, the password (not including client ID), and the service application ID1 and ID2 (the password information and the logon/logoff state information are omitted).

The operation will be now described.

[S1] The client application 20-1 transmits, as the user account information, the user name, the password, the client ID1 and the service application ID1 to the server application 40-1.

[S2] Using the user account management table T, the account authentication means 41*a* recognizes authenticity of the user, and then returns a normal response.

[S3] Based on the service application ID1 transmitted from the client application 20-1, the service application control means 43*a* transmits the fault information to the service application 30-1 which is to control the notification of the fault information, and also starts the service application 30-1.

The fault information may be transmitted one by one in advance to the service application 30-1 each time a fault occurs.

To start the service application 30-1, the client ID1 received from the client application 20-1 is transmitted to the service application 30-1.

[S4] When started normally, the service application 30-1 returns a normal response to the server application 40-1.

[S5] The service application 30-1 provides the fault information to the client application 20-1 corresponding to the client ID1.

Although in the above description, only one service application (service application 30-1) is started, a plurality of service applications can also be started.

Specifically, where the service application ID1 and ID2 are transmitted from the client application 20-1, the service applications 30-1 and 30-2 are started, so that the client application 20-1 can receive the fault information and the performance information.

As described above, the network monitoring system 1*a* of the present invention is constructed such that the service application control means 43*a* starts a service application(s) in accordance with the user account information transmitted from the client application 20-1.

This simplifies the logon process of the client application. Also, in the conventional system, where a plurality of service applications are to be started, the client application starts the corresponding service applications one by one at the time of logon. According to the present invention, a plurality of service applications are collectively started by the server application 40-1.

Thus, in order to collectively start a plurality of service applications, the user side has only to transmit the user account information including corresponding service application IDs, whereby the convenience of the user-side operation can be improved.

Figure 6:
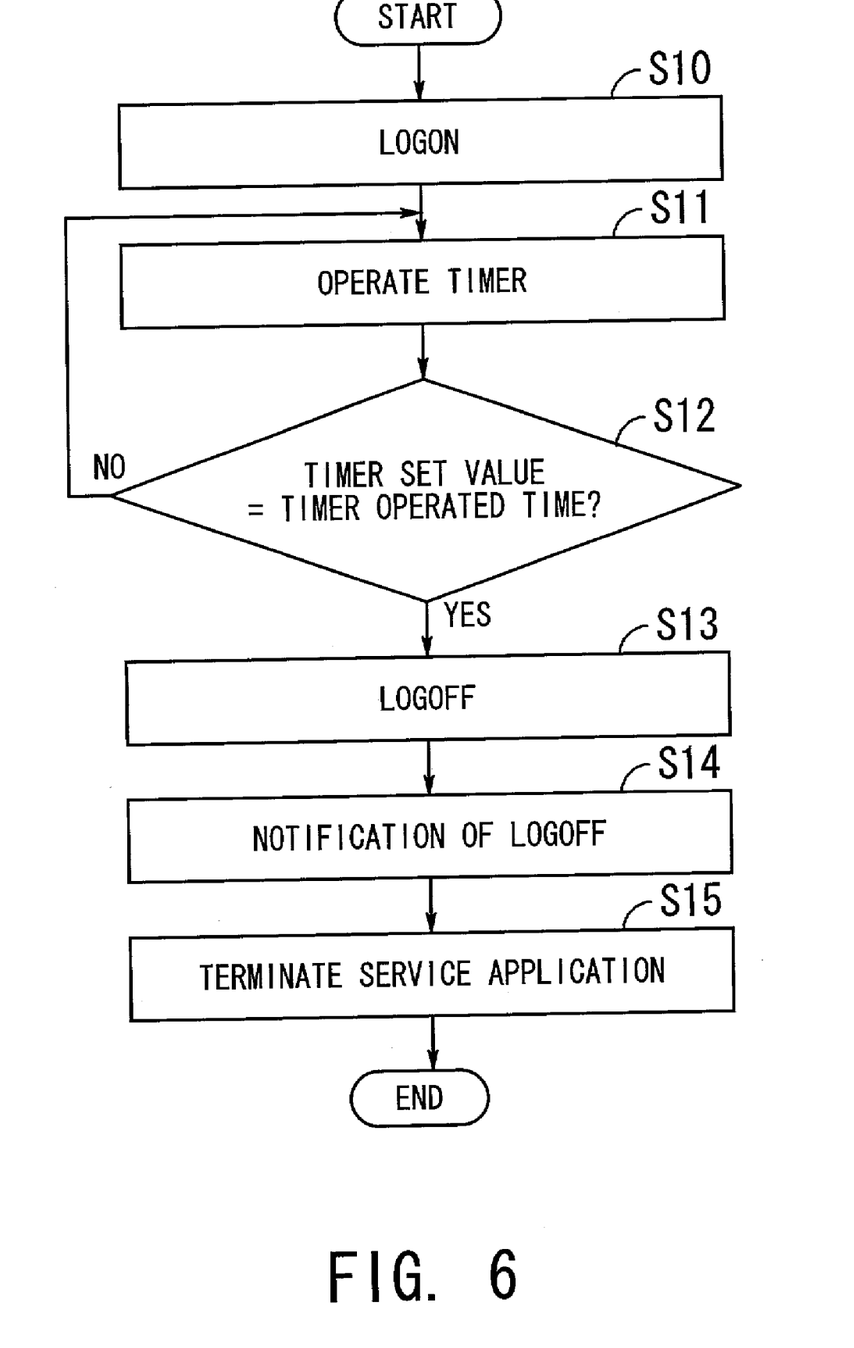
FIG. 6 is a chart showing an operation flow of the network monitoring system in connection with timer setting means.

The timer setting means 44*a* will be now described. FIG. 6 shows an operation flow of the network monitoring system 1*a* in connection with the timer setting means 44*a*.

[S10] The server application 40-1 logs on.

[S11] The timer setting means 44*a* sets a timer in operation.

[S12] The timer setting means 44*a* compares a timer operated time with a timer preset value. If the timer preset value is not yet reached by the timer operated time, the flow returns to Step S11; if the former is reached by the latter, the flow proceeds to Step S13.

[S13] The timer setting means 44*a* causes the server application 40-1 to log off.

[S14] The timer setting means 44*a* notifies the client application 20-1 that the server application 40-1 has logged off.

[S15] The service application control means 43*a* terminates the then-activated service application.

As described above, the timer setting means 44*a* of the present invention is constructed such that the timer is started at the time of logon of the server application 40-1 and that when the timer set value is reached, the server application 40-1 autonomously logs off.

Accordingly, by suitably setting the timer value, the operator can cause the server application 40-1 to log off at a desired time. In cases where the user stays away from the client device 2 for a while, for example, he/she can prohibit a third person from using the client device 2.

Figure 7:
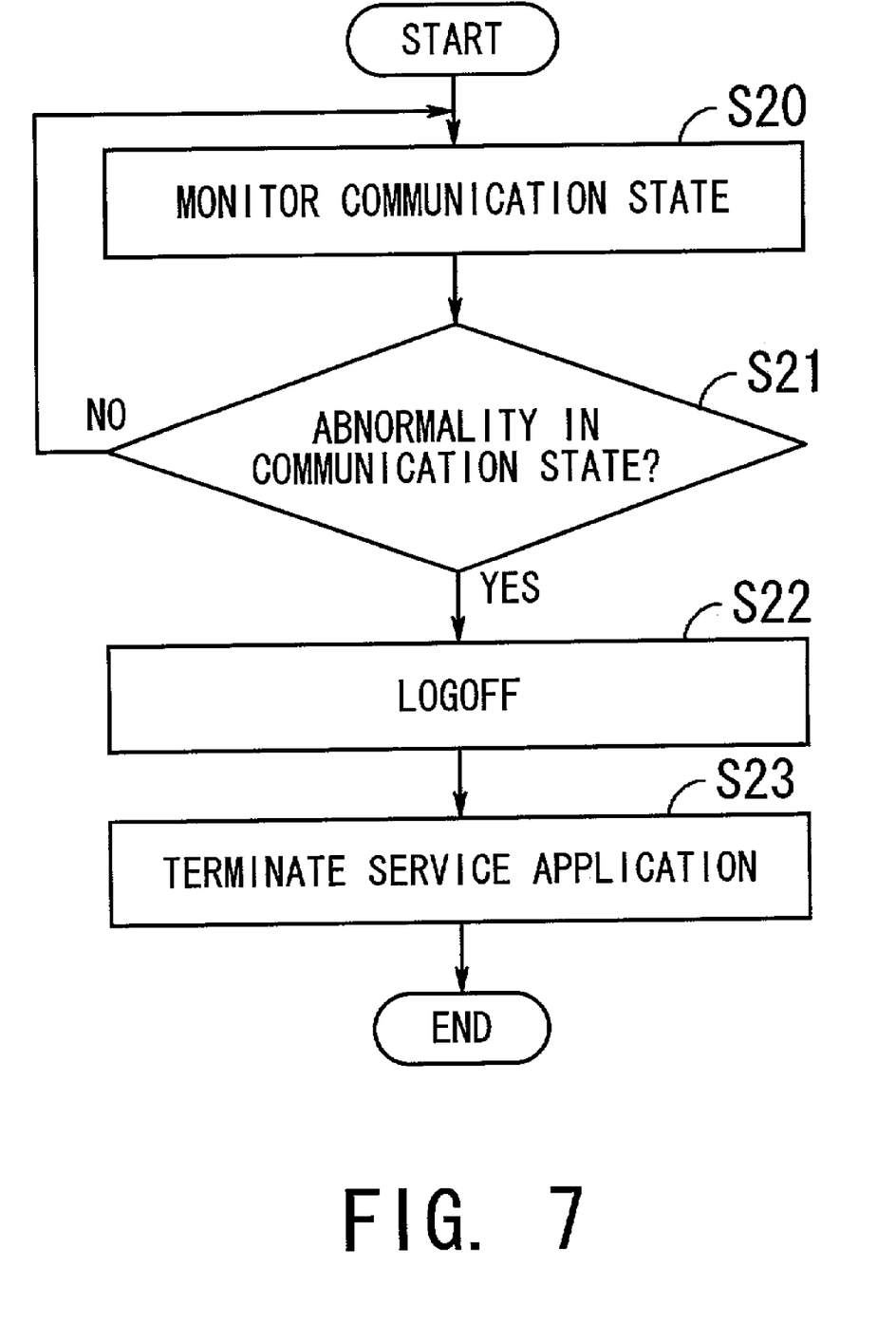
FIG. 7 is a chart showing an operation flow of the network monitoring system in connection with communication state monitoring means.

The communication state monitoring means 45*a* will be now described. FIG. 7 shows an operation flow of the network monitoring system 1*a* in connection with the communication state monitoring means 45*a*.

[S20] The communication state monitoring means 45*a* monitors the state of communication between the client application 20-1 and the server application 40-1.

The communication state monitoring means 45*a* monitors the communication state by, for example, periodically transmitting data to the client application 20-1 and determining whether or not the client application 20-1 returns ACK indicative of reception of the data to the server application 40-1.

[S21] If abnormality in the communication state is detected by the communication state monitoring means 45*a*, the flow proceeds to Step S22; if not, the flow returns to Step S20.

[S22] The communication state monitoring means 45*a* causes the server application 40-1 to log off.

[S23] The service application control means 43*a* terminates the then-activated service application.

As described above, the communication state monitoring means 45*a* of the present invention monitors the state of communication between the server application 40-1 and the client application 20-1 and, in case of fault, autonomously causes the server application 40-1 to log off.

Accordingly, in the event the client application 20-1, for example, abnormally ends and the communication between the client application 20-1 and the server application 40-1 is interrupted, the communication state monitoring means 45*a* of the present invention autonomously causes the server application 40-1 to log off.

Namely, when the client application 20-1 has logged off, the server application 40-1 also logs off, so that status inconsistency does not occur.

Consequently, when the user retries a logon with the client application 20-1 restarted, the server application 40-1 can start without a hitch.

As described above, in the distributed processing system according to the present invention, the start and termination at logon and logoff, respectively, of the service application corresponding to the client application are controlled by the server application. This simplifies the logon/logoff process of the client application, making the user-side operation more transparent.

Also, in the network monitoring system according to the present invention, when the network is monitored, the start and termination at logon and logoff, respectively, of the service application corresponding to the client application are controlled by the server application. This simplifies the logon/logoff process of the client application, making the user-side operation for the network monitoring more transparent.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network monitoring system for performing distributed processing to monitor a network, comprising:
 a client device having a client application, said client application including information transmission requesting means for making a request for transmission of network information and information providing means for providing the received network information to a user; and
 a server device having a first service application, a second service application and a server application, said first service application for managing first network information, the first network information being included in fault information about a fault occurring within the network, and said second service application for managing second network information, the second network information being included in performance information including operation status of the network and information relaying/transmitting means for relaying the first/second network information to be transmitted to the client application, said server application including account authentication means for verifying authenticity of account of the client application, said account authentication means including a user account management table for managing user account information including a first identifier of said first service application and a second identifier of said second service application, and managing logon/logoff state information indicating a logged-on/logged-off state of the server application, information storage means for storing the first/second network information, and first service application control means for controlling start and termination at logon and logoff, respectively, of the first service application corresponding to the client application, and collectively controlling start of the first service applications, without starting the first service applications one by one at a time of logon by said client application, when the first service applications is to be started, said start occurring in response to receipt of the user account information with the first identifier transmitted from said client application, and second service application control means for controlling start and termination at logon and logoff, respectively, of the second service application corresponding to the client application, and controlling start collectively of the second service application, without starting the second service application, one by one at the time of logon by said client application, when the second service application is to be started, said start occurring in response to receipt of the user account information with the second identifier transmitted from said client application,
 wherein, when a logon is instructed from the client application, said account authentication means checks the current state of the server application in accordance with said user account management table, and sends a notification of error to the client application, if the server application is already in the logged-on state,
 wherein said server application of said server device further includes timer setting means, said timer setting means starting a timer at logon of the server application and, when a timer set value is reached, autonomously causing the server application to log off,
 wherein said server application of said server device further includes communication state monitoring means, said communication state monitoring means monitoring a state of communication between the server application and the client application and, when a fault has occurred, autonomously causing the server application to log off.

2. The network monitoring system according to claim 1, wherein said user account management table manages detailed information about a password.

* * * * *

UNITED STATES PATENT AND TRADEMARK OFFICE
CERTIFICATE OF CORRECTION

| | |
|---|---|
| PATENT NO. | : 7,281,027 B2 |
| APPLICATION NO. | : 10/151970 |
| DATED | : October 9, 2007 |
| INVENTOR(S) | : Hiroaki Komine et al. |

It is certified that error appears in the above-identified patent and that said Letters Patent is hereby corrected as shown below:

Column 10, Line 5, change "applications," to --application,--.

Column 10, Line 7, change "applications" to --applications--.

Signed and Sealed this

Eighth Day of April, 2008

JON W. DUDAS
*Director of the United States Patent and Trademark Office*